United States Patent [19]

Depcik

[11] Patent Number: 4,900,600
[45] Date of Patent: Feb. 13, 1990

[54] FILLED PLASTIC GRANULATE

[75] Inventor: Hans W. Depcik, Duesseldorf, Fed. Rep. of Germany

[73] Assignee: Bayer Aktiengesellschaft, Leverkusen, Fed. Rep. of Germany

[21] Appl. No.: 787,966

[22] Filed: Oct. 16, 1985

[30] Foreign Application Priority Data

Oct. 17, 1984 [DE] Fed. Rep. of Germany ....... 3437947

[51] Int. Cl.⁴ .............................................. B44C 1/26
[52] U.S. Cl. ..................................... 428/67; 428/119; 428/156; 428/222; 428/293; 428/298; 428/303; 428/332
[58] Field of Search ................ 428/67, 119, 222, 156, 428/293, 298, 303.1, 332; 427/156, 293, 298, 303.1

[56] References Cited

U.S. PATENT DOCUMENTS

| | | | |
|---|---|---|---|
| 3,846,215 | 11/1974 | Maistre | 161/47 |
| 3,866,925 | 2/1975 | Maimstrom et al. | 277/164 |
| 4,241,763 | 12/1980 | Antal et al. | 138/127 |
| 4,265,981 | 5/1981 | Campbell | 428/591 |
| 4,421,582 | 12/1983 | Horsma et al. | 156/86 |

FOREIGN PATENT DOCUMENTS 872027  7/1961  United Kingdom ............... 428/222

Primary Examiner—Ellis P. Robinson
Assistant Examiner—P. J. Ryan
Attorney, Agent, or Firm—Connolly and Hutz

[57] ABSTRACT

To enable plastic articles to be produced with long fibers, closely folded or coiled inserts are incorporated into the granulates and open up later over their entire length during plastification, thus forming a dense network in the finished plastic article.

7 Claims, 1 Drawing Sheet

FILLED PLASTIC GRANULATE

This invention relates to a filled granulate, in particular a filled plastic granulate, for further processing in machines having plasticizing devices, containing one or more plastic materials combined with inserts.

Many plastic articles are provided with inserts to increase strength and/or to achieve better shielding against electrical, electromagnetic and magnetic fields and sweep radiation.

It is known to provide plastics articles with electrically conductive coatings at a later stage by galvanization, metallization under vacuum, metal flame spraying or lacquering.

The application of these coatings necessitates additional complicated operations during which the surface can easily be damaged owing to its sensitivity, causing the effectiveness of the shield to diminish significantly.

Fillers such as carbon black, graphite, aluminium flakes, metal fibres and carbon fibres are also added to the plastics granulate and injected to form moulded articles after plastification. The mechanical charging is generally effected in the form of a mixture of plastics granulate and fillers.

As high shearing forces generally occur during plastification, undesirable crushing occurs. In order nevertheless to achieve the desired effect with respect to strength and/or shielding, it is necessary to add large quantities of fillers (up to 45% by weight), which is very expensive and makes the plastics article unnecessarily heavy and reduces the strength of such mixtures.

An object of the invention is to find a granulate from which plastic articles can be produced with inserts which are long or of large surface area, wherein high strength and a high shielding effect over a wide frequency range, in particular in the low range, can be achieved while using a small proportion of insert material, by good distribution and combination of the inserts relative to one another.

This object is achieved according to the invention in that at least a portion of the inserts have an extended length, measured after unwinding, which is at least 1.2 especially 2 times greater than the greatest internal spatial dimension (distance from outer edge to outer edge) of the plastics granulate and in that these inserts, compacted three-dimensionally in one or more directions, are combined with the plastics granulate.

Figure 1:
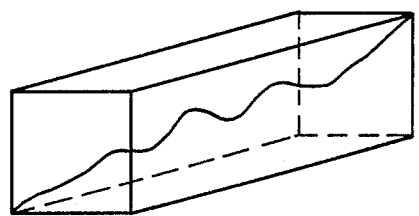
FIG. 1 illustrates the granulate with insert in wave form.
Figure 2:
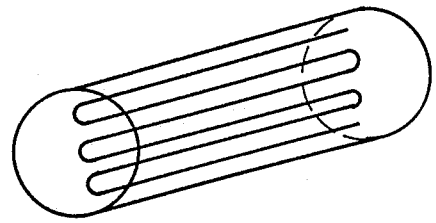
FIG. 2 illustrates the granulate with insert in highly amplified wave form.
Figure 3:
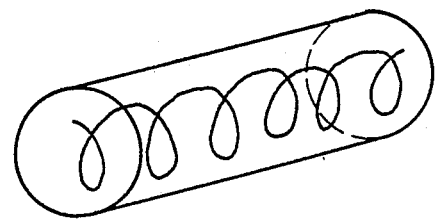
FIG. 3 illustrates the granulate with insert in the form of a coil.
Figure 4:
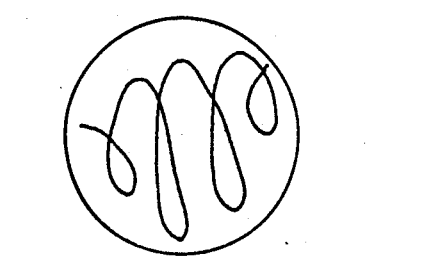
FIG. 4 illustrates the granulate with insert in the form of a coil.
Figure 5:
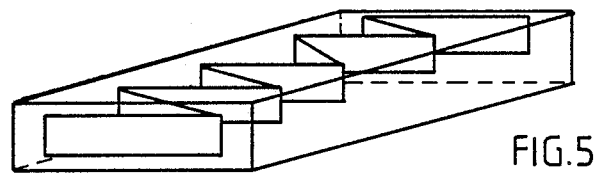
FIG. 5 illustrates the granulate with insert in folded form.

By concentration of each insert into a compact space, it is possible to arrange inserts of great length or surface area in the granulate itself or directly on the surface thereof such that they are substantially protected from crushing during the plastification process.

However, once the composition is mobile and therefore no longer abrasive, the inserts can stretch and cross-link with one another, and this substantially improves the quality of the finished article with regard to strength and to a possible shielding effect.

In a particular embodiment, the inserts are electrically conductive.

An electromagnetic shield in the frequency ranges of from several GHz down to 30 MHz, which easily covers, in particular, the problem range below 300 MHz, can be achieved by electrically conductive inserts having a length greater than 7 mm, in particular greater than 30 mm, the proportion of added inserts being from 3 to 40% by weight, preferably from 6 to 20% by weight.

In a further embodiment, the inserts are arranged as a coil.

The term coil includes spiral or cylindrical coils which are generally arranged centrally in the granulate or symmetrically to the axis in cylindrical granulates. It is thus possible to arrange, for example, metal wires having a length after being unwound of two, three, ten and up to more than one hundred times the length of the cylindrical plastics granulate.

In a further embodiment, the inserts are folded.

Folding is a simple and inexpensive mechanical process which can be carried out immediately prior to incorporation into the granulate, small lengths being dealt with by single folding and great lengths by multiple folding.

In a conceivable embodiment, the inserts are held together by a resilient, releasable closure.

This method is particularly suitable for flat inserts which are incorporated resiliently in the granulate. Once the plastic material is plastic, the mechanical or adhesive closure opens and flat sheets are formed by unfolding, which produce a good electrical, electromagnetic or magnetic shielding effect in an arrangement which covers large areas.

In a possible embodiment, the end parts of the inserts are designed at least in part as connecting elements.

Contacting of the inserts is improved by small hooks at the end and this is advantageous, among other things, for electromagnetic shielding.

In one embodiment, the inserts are bonded by means of adhesive which melts at high temperatures.

For incorporation into the granulate, it is often advantageous to fix the three-dimensionally compressed articles by pre-finishing. This adhesive loses its adhesiveness at high temperatures so that the inserts can unfold freely just before the actual injection process. This measure prevents freely projecting parts from being subjected to shearing and therefore to damage in the starting phase. A protective sheath can also be provided at the same time.

Suitable plastic materials include any thermoplastics and other materials in which a granulate is converted for the purpose of moulding into a phase in which the molecules have greater mobility.

Inorganic and organic filaments, galvanized textile threads, metallic wires and flakes can be inserted as reinforcing agents.

The maximum length should be from 7 to 6000 mm, in particular from 10 to 80 mm, with a diameter of between 4 and 100 $\mu$m, especially 30–60 $\mu$m. Any platelets or bodies having a surface area of from 2 to 30 mm$^2$, in particular from 8 to 20 mm$^2$ are suitable as flat sheets. The material can be soft or resilient, the restoring forces in the latter case causing the material to stretch. It is obviously also possible to compress strips of film, fabric and netting in the form just described.

Suitable materials include, in particular, magnetic, highly permeable amorphous metals which provide, for example, a desirable magnetic shield (20 dB) in the frequency range of <30 MHz.

I claim:

1. Filled granulate, in particular plastic granulate, for further processing in machines with plasticizing devices containing one or more plastic materials in combination with inserts, characterized in that at least a portion of the inserts have an extended length, measured after unwinding, which is at least 1.2 times greater than the greatest internal spatial dimension of the plastic granulate and in that these inserts, compacted three-dimensionally in one or more directions, are combined with the plastic granulate.

2. Filled granulate according to claim 1, characterised in that the inserts are electrically conductive.

3. Filled granulate according to claims 1 or 2, characterised in that coils are arranged as inserts.

4. Filled granulate according to claims 1 or 2, characterised in that the inserts are folded.

5. Filled granulates according to claims 1 or 2, characterised in that the inserts are held together respectively by a resilient releasable closure.

6. Filled granulate according to claims 1 or 2, characterised in that the end parts of the inserts are formed at least in part as connecting elements.

7. Filled granulate according to claims 1 or 2, characterised in that the inserts are bonded by means of an adhesive which melts at high temperatures.

* * * * *